United States Patent [19]
Yajima et al.

[11] Patent Number: 5,191,450
[45] Date of Patent: Mar. 2, 1993

[54] PROJECTION-TYPE COLOR DISPLAY DEVICE HAVING A DRIVING CIRCUIT FOR PRODUCING A MIRROR-LIKE IMAGE

[75] Inventors: Akitaka Yajima; Junichi Nakamura, both of Suwa, Japan

[73] Assignee: Seiko Epson Corporation, Tokyo, Japan

[21] Appl. No.: 863,387

[22] Filed: Apr. 3, 1992

Related U.S. Application Data

[63] Continuation of Ser. No. 494,365, Mar. 16, 1990, abandoned, which is a continuation-in-part of Ser. No. 181,122, Apr. 13, 1988, Pat. No. 4,909,601.

[30] Foreign Application Priority Data

Apr. 14, 1987 [JP] Japan .................................. 62-91314
Nov. 16, 1987 [JP] Japan ................................ 62-288647

[51] Int. Cl.$^5$ ................................................ G02F 1/13
[52] U.S. Cl. ...................................... 359/54; 359/40; 359/58; 359/64; 340/784; 353/122
[58] Field of Search ................. 350/331 R, 333, 334, 350/337, 342, 345; 340/784, 784 E, 794, 795; 353/31, 34, 37, 33, 81, 122; 359/40, 53, 58, 64, 54

[56] References Cited

U.S. PATENT DOCUMENTS

| | | | |
|---|---|---|---|
| 1,662,693 | 3/1928 | Astafiev . | |
| 2,202,257 | 5/1940 | Klaver | 88/1 |
| 2,737,076 | 3/1956 | Rock, Jr. | 88/1 |
| 2,754,718 | 7/1956 | Rock et al. | 88/1 |
| 2,971,051 | 12/1961 | Back | 178/5.4 |
| 3,303,278 | 5/1964 | Beno et al. | 178/5.4 |
| 3,588,326 | 6/1970 | Marle | 178/5.4 |
| 3,704,061 | 11/1972 | Traxis | 350/171 |
| 3,767,290 | 10/1973 | Lang et al. | 350/173 |
| 4,127,322 | 11/1978 | Jacobsen et al. | 353/31 |
| 4,191,456 | 3/1980 | Hong et al. | 350/342 |
| 4,425,028 | 1/1984 | Gagnon et al. | 350/331 R |
| 4,448,491 | 5/1984 | Okubo | 350/344 |
| 4,461,542 | 7/1984 | Gagnon et al. | 350/342 |
| 4,464,018 | 8/1984 | Gagnon | 350/331 R |
| 4,464,019 | 8/1984 | Gagnon et al. | 350/331 R |
| 4,499,459 | 2/1985 | Sasaki et al. | 350/333 |
| 4,500,172 | 2/1985 | Gagnon et al. | 350/331 R |
| 4,544,237 | 10/1985 | Gagnon | 350/331 R |
| 4,653,862 | 3/1987 | Morozumi | 350/333 |
| 4,679,909 | 7/1987 | Hamada et al. | 350/333 |
| 4,687,301 | 8/1987 | Ledebuhr | 350/401 |
| 4,690,526 | 9/1987 | Ledebuhr | 353/31 |
| 4,749,259 | 6/1988 | Ledebuhr | 350/337 |
| 4,759,610 | 7/1988 | Yanagisawa | 350/334 |
| 4,783,146 | 11/1988 | Stephany et al. | 350/336 |
| 4,842,374 | 6/1989 | Ledebuhr | 350/331 R |
| 4,904,061 | 2/1990 | Aruga | 350/345 |
| 4,909,601 | 3/1990 | Yajima et al. | 350/331 R |

FOREIGN PATENT DOCUMENTS

| | | |
|---|---|---|
| 0266184 | 4/1988 | European Pat. Off. . |
| 1096635 | 1/1961 | Fed. Rep. of Germany . |
| 1560501 | 2/1969 | France . |
| 48-79596 | 10/1973 | Japan ............................ 350/331 R |

(List continued on next page.)

OTHER PUBLICATIONS

"Matrix-Addressed Liquid Crystal Projection Display", P. J. Wild, SID 72 Digest, pp. 62, 63, 1972.

(List continued on next page.)

Primary Examiner—Rolf Hille
Assistant Examiner—Minhloan Tran
Attorney, Agent, or Firm—Blum Kaplan

[57] ABSTRACT

A projection-type display device for producing a synthesized symmetrical projected image. The device includes three liquid crystal light valves associated with the three primary colors producing three separate images. One of the light valves is horizontally scanned in a direction opposite to the horizontal scanning direction of the other two light valves. The two images produced by the light valves which scan in the same horizontal direction are mirror images of the image produced by the third light valve.

30 Claims, 8 Drawing Sheets

FOREIGN PATENT DOCUMENTS

| | | | |
|---|---|---|---|
| 58-111193 | 1/1985 | Japan | 350/331 R |
| 58-111194 | 1/1985 | Japan | 350/331 R |
| 59-37166 | 9/1985 | Japan | 350/331 R |
| 61-102892 | 5/1986 | Japan . | |
| 59-221556 | 5/1986 | Japan | 350/331 R |
| 61-150487 | 7/1986 | Japan . | |
| 62-59919 | 3/1987 | Japan . | |
| 475415 | 4/1937 | United Kingdom . | |

OTHER PUBLICATIONS

"Recent Advances in the Single-Gun Color Television Light-Valve System", William E. Good, SID 75 Digest, 1975.

"Optical Properties of a Liquid-Crystal Image Transducer at Normal Incidence: Mathematical Analysis and Application to the Off-State", G. Paul Montgomery, Jr., J. Opt., Soc. Am., vol. 70, No. 3, Mar. 1980, pp. 287-301.

"B/W and Color LC Video Displays Addressed by Poly Si TFTs", Shinji Morozumi et al., SID 83 Digest, pp. 156-157, 1983.

Shinji Morozumi, Tomio Sonehara, Hiroshi Kamakura, Takeshi Ono and Shuji Aruga; LCD Full-Color Video Projector, SID 86 Digest pp. 375-378, 1986.

PROJECTION-TYPE COLOR DISPLAY DEVICE HAVING A DRIVING CIRCUIT FOR PRODUCING A MIRROR-LIKE IMAGE

CROSS-REFERENCE TO RELATED APPLICATION

This is a continuation of application Ser. No. 07/494,365, filed Mar. 16, 1990, now abandoned, which is a continuation-in-part application of Ser. No. 07/181,122, filed Apr. 13, 1988, now U.S. Pat. No. 4,909,601.

BACKGROUND OF THE INVENTION

This invention relates generally to a projection-type color display device, and more particularly to the driving circuitry for liquid crystal light valves used in a projection-type display device to project and form a symmetrical colored image on a screen.

Conventional projection-type color display devices which use liquid crystal light valves such as disclosed in Japanese Laid Open Application No. 60-179,723 initially separate the image to be displayed into its red, green and blue wavelengths of light using a dichroic mirror. Each of these wavelengths of light is then directed toward a corresponding light valve which permits or prevents transmission of light therethrough (i.e., image modulation). The red, green and blue wavelengths of light which are permitted to pass through these light valves are synthesized by additive color mixing using dichroic mirrors, a dichroic mirror prism or the like. The synthesized image is then magnified and projected onto a screen through a projection lens.

Light sources used in projection-type color display devices are unable to project perfectly parallel rays of light. The intensity of these nonparallel rays of light, especially as the distance from the light source increases, diminishes (i.e., dampens). Consequently, the brightness of the image produced by the device diminishes.

Spectral characteristics of the light source are not constant, that is, the spectral characteristic curve is not flat. A neutral density (ND) filter is typically used to adjust the white balance of the light source. The ND filter dampens the peaks of the spectral characteristic curve. Depending upon the light source, a ND filter may be unable to provide an acceptable white balance. For example, a metal halide lamp has a spectral characteristic curve with a peak around the green wavelength. Dampening of the green light through use of an ND filter results in extremely dark images formed by a conventional projection-type color display device.

U.S. patent application Ser. No. 07/181,122, discloses that each of the three liquid crystal light valves include a matrix array of picture element electrodes coupled to a corresponding thin film transistors (referred to hereinafter as thin film transistors (TFT)) to control which picture element electrodes are turned ON and OFF. The light sensitive TFT's are shielded from incident light passing through the light valve to avoid generation of unnecessary leakage current by a mask (light protection layer) formed on one of the substrates of each light valve.

The three liquid crystal light valves within the projection-type color display are arranged so that one of the three light valves is reversed (i.e. flipped) relative to the other two light valves to provide a physically compact device. This is done to allow scanning horizontally in the opposite direction. However, flipping the light valve allows incident light to strike the TFTs before passing through the associated mask. The mask fails to shield the TFT from the incident light and the performance of the TFT is adversely affected. An unacceptable contrast ratio in the image and overall deterioration in the picture quality results.

Accordingly, it is desirable to provide a projection-type display using liquid crystal light valves which are assembled in a compact image display device. The device should provide bright images with a high level of picture quality and a high level of picture reproducibility. It is also desirable to provide a projection-type color display device which avoids the use of one or more filters to adjust the white balance of the light source.

SUMMARY OF THE INVENTION

Generally speaking, in accordance with the invention, light produced by a light source is separated into its primary color components by a group of dichroic mirrors. Each component is directed toward a different light valve so that a first liquid crystal light valve is associated with a first primary color, a second liquid crystal light valve is associated with a second primary color and a third liquid crystal light valve is associated with a third primary color. Each of the liquid crystal light valves include a plurality of liquid crystal picture elements.

A dichroic prism or other suitable integrating device combines the three images by reflecting an odd number of times at least one of the three images and transmitting or reflecting an even number of times at least one of the three images to produce a synthesized image which is projected by a lens towards a screen or the like.

The three light valves are each driven by a driving circuit. The driving circuit is typically fabricated on a substrate of the active matrix of the light valve with the TFTs shielded from light by a light protection layer (i.e., mask). Alternatively, the discrete driving circuit for each light valve is connected to the outer frame of the light valve. A driving circuit fabricated on an active matrix substrate includes two shift registers. One of the shift registers stores signal data of the image which is supplied to the segment electrodes. The supply of the signal data to the segment electrodes is referred to herein as horizontally scanning the image. The other shift register stores scan data of the image which is supplied to the row electrodes. The supply of the scan data to the row electrodes in referred to herein as vertically scanning the image.

To avoid reversing one of the three light valves relative to the other two light valves, the horizontal scanning direction associated with each light valve which produces an image reflected an odd number of times by the dichroic prism or mirror and the horizontal scanning direction of each light valve which produces an image transmitted or reflected an even number of times by the dichroic prism or mirror are opposite to one another. Accordingly, each light valve is positioned so that the mask intercepts incident light prior to passing through the TFT and thereby shields portions of the TFT from the incident light.

Each dichroic mirror is disposed within the device so that the optical length between the light source and each liquid crystal light valve is related to the level of luminous intensity of the primary color associated with the light valve produced by the light source.

Different types of light sources can be used such as, but not limited to, tungsten halogen, xenon and metal halide lamps.

Accordingly, it is an object of the invention to provide improved projection-type display device using liquid crystal light valves which are assembled in a compact fashion and provide light shielding protection to portions of the TFT within each light valve.

Another object of the invention is to provide improved protection-type display device using liquid crystal light valves having driving circuitry which horizontally scans the image in different directions depending on how the image is to be combined with the other images.

It is still another object of the invention to provide an improved projection-type display device which produces bright images with a high level of picture quality and a high level of picture reproducibility.

Still other objects and advantages of the invention will, in part, be obvious and will, in part, be apparent from the specification.

The invention accordingly comprises the several steps and the relation of one or more of such steps with respect to each of the others, and the apparatus embodying features of construction, a combination of elements and arrangement of parts which are adapted to reflect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings in which.

DESCRIPTION OF THE PREFERRED EMBODIMENTS

Embodiment 1

Figure 1:
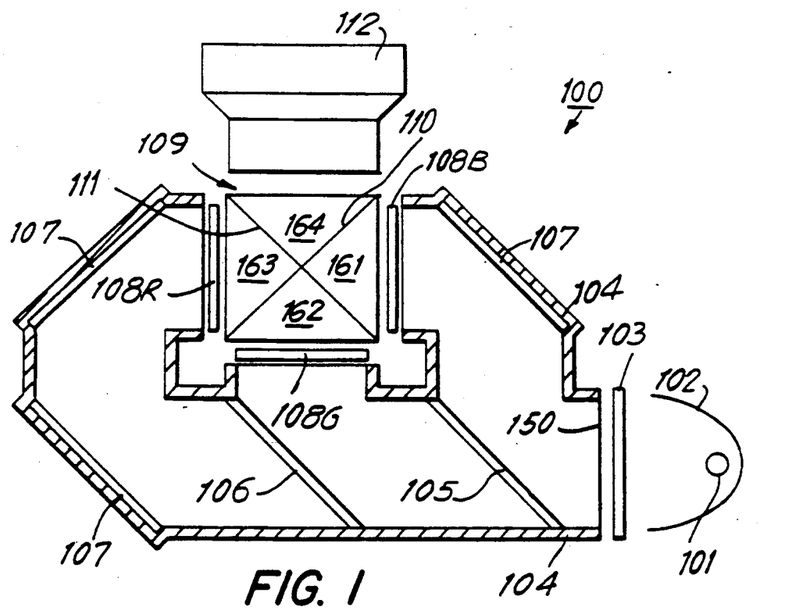
FIG. 1 is a top plan view, partially in cross section, of a projection-type color display device in accordance with one embodiment of the invention.

As shown in FIG. 1, a projection-type color display device 100 includes a tungsten halogen lamp which serves as a light source 101. White light representative of the image to be projected is emitted from light source 101, concentrated by a parabolic mirror 102 and directed toward a filter 103 for absorbing heat rays within the infrared region of the white light.

Parabolic mirror 102 concentrates (i.e., condenses) the light rays so as to provide substantially parallel rays of light directed toward filter 103. Nevertheless, these light rays are not parallel. The quality of the image represented by the light is directly affected by the parallelism of the light rays. As the optical distance from the light source to each of the liquid crystal light valves 108B, 108G and 108R increases, the quality of the light and the quality of the image represented by the light decreases. Parabolic mirror 102 can be made from, but is not limited to, a combination of spherical mirrors and condenser lenses or an ellipsoidal reflector.

Light transmitted through filter 103 (i.e., visible radiation) enters a dichroic mirror group which includes a light guide 104, a blue light dichroic mirror 105, a green light dichroic mirror 106 and reflection mirrors 107. Light guide 104 includes a tube having an opening 150 through which light enters light guide 104 from filter 103. The size of opening 150 is substantially the same as the size of the image (i.e., picture) transmitted by a liquid crystal light valve 108B, a liquid crystal light valve 108G and a liquid crystal light valve 108R. The dichroic mirror group serves to segregate the colored image into its primary colors. The mirror-like surfaces of blue light dichroic mirror 105, green light dichroic mirror 106 and reflection mirrors 107 bend and direct the colored light towards liquid crystal light valves 108B, 108G and 108R.

The internal surfaces of light guide 104 except for reflection mirror 107 are planished with aluminum by vacuum deposition to improve their reflective properties. Light is prevented from scattering and escaping from device 100 by light guide 104. Light guide 104 serves to maintain a high level of brightness of light striking liquid crystal light valves 108B, 108G and 108R. Blue light dichroic mirror 105, green light dichroic mirror 106 and reflection mirrors 107 are positioned within and affixed to light guide 104.

As the colored light passing through opening 150 strikes blue light dichroic mirror 105, the blue colored light, (i.e., having a wavelength of about 500 nanometers (nm) or less) is reflected toward reflection mirrors 107 which redirect the path of the blue light toward liquid crystal light valve 108B.

Light which is substantially yellow in color passes through blue light dichroic mirror 105 and strikes green light dichroic mirror 106. Green light dichroic mirror 106 reflects green colored light (i.e., having a wavelength of about 500 nm to approximately 590 nm) towards liquid crystal light valve 108G.

Light passing through green light dichroic mirror 106 has a substantially red color and is redirected by reflection mirror 107 towards liquid crystal light valve 108R.

The light of light source 101, which now has been segregated into its primary colors of blue, green and red, is color modulated by liquid crystal light valves 108B, 108G and 108R, respectively. The driving circuit including a matrix array of thin film transistors (TFT), discussed in greater detail below, applies the appropriate signals to each of these liquid crystal light valves for controlling the transmission of the associated primary color therethrough. The colored light which passes through liquid crystal light valves 108B, 108G and 108R are then synthesized by a dichroic prism group 109 and magnified for projection by a projection lens 112.

The synthesized image produced by dichroic prism group 109 is turned upside and in a sideways direction again by projection lens 112 to create an image displayed on the screen which is from left to right and from top to bottom. In assembling device 100, red light liquid crystal light valve 108R or blue light liquid crystal light valve 108B can be turned over and used as liquid crystal light valve 108G. The properties of light valve 108G, however, would then deteriorate more quickly (as discussed below). Therefore, it is not practical to use as liquid crystal light valve 108G another liquid crystal light which has been turned over.

Figure 2:
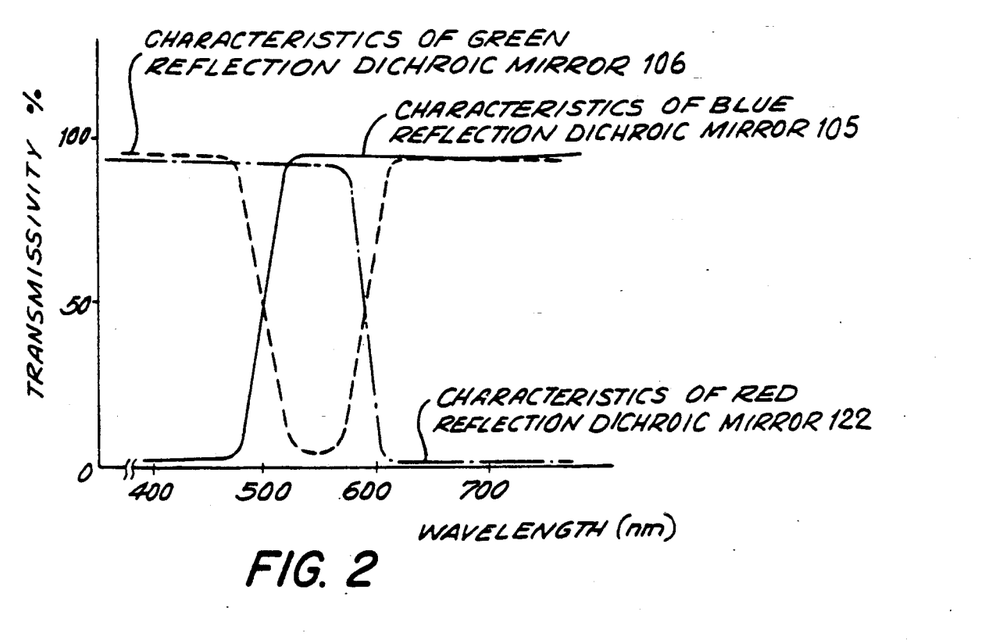
FIG. 2 is a plot of transmissivity versus wavelength of the dichroic mirrors.

As shown in FIG. 2, the transmissive characteristics of blue light dichroic mirror 105, green light dichroic mirror 106 and a red light dichroic mirror 122 (discussed below) are graphically illustrated.

Figure 3:
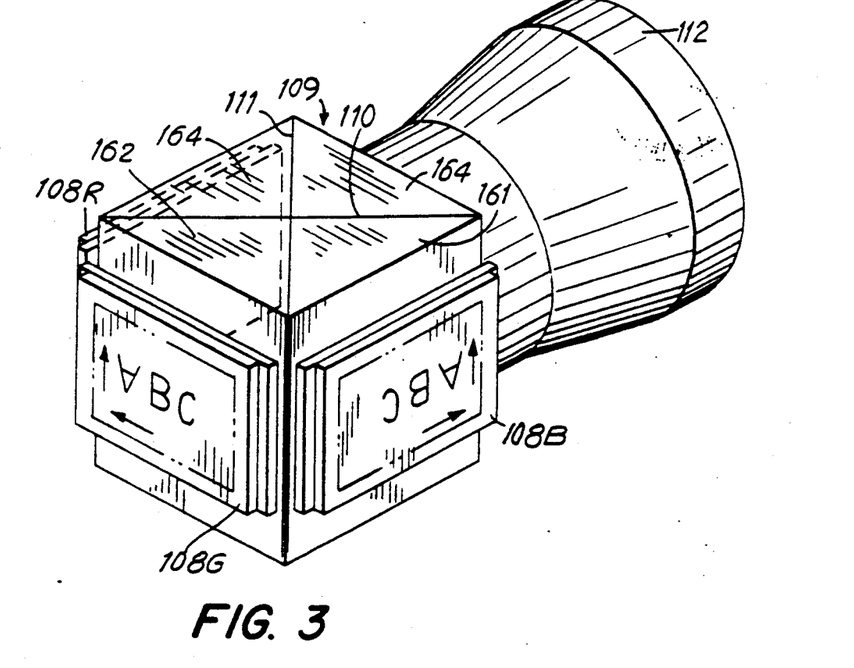
FIG. 3 is a diagrammatic perspective view of the liquid crystal light valves and dichroic prisms.

FIG. 3 illustrates the arrangement of dichroic prism group 109 which includes four separate right angled dichroic prisms 161, 162, 163 and 164. A red reflection surface 110 crosses at a substantially right angle to a blue reflection surface 111. Prisms 161, 162, 163 and 164 are connected together by an optical bonding agent or other suitable material. Red reflection surface 110 and blue reflection surface 111 are formed by vapor deposition of a dielectric multi-layer film on the right angled surfaces of prisms 161, 162, 163 and 164. The spectral characteristics of red reflection surface 110 and blue reflection surface 111 are the same as those shown for red light dichroic mirror 122 and blue light dichroic mirror 105 of FIG. 2.

Red colored light passing through liquid crystal light valve 108R is reflected by red reflection surface 110. Blue colored light passing through liquid crystal light valve 108B is reflected by blue reflection surface 111. Green colored light passing through liquid crystal light valve 108G is transmitted without reflection through dichroic prism group 109. The red, green and blue colored lights after being synthesized by dichroic prism group 109 form a single colored image which is projected onto a screen (not shown) by single projection lens 112. Adjustment of the optical and/or positional relation among the three liquid crystal light valves as viewed from projection lens 112 may be required in order to obtain an acceptable single colored image. The single colored image produced by projection-type display device 100 avoids color drifts even around the displayed image while achieving a high saturation of color due to a perfect additive mixture of color stimuli by each pixel.

Figure 4:
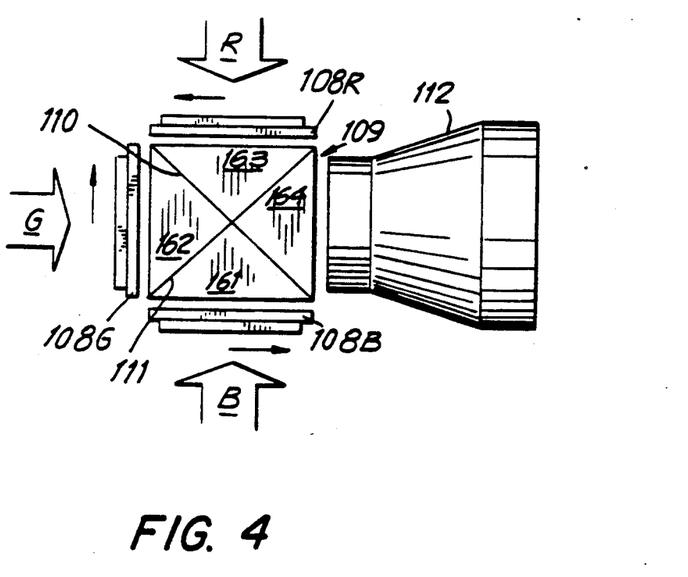
FIG. 4 is a diagrammatic top plan view of the liquid crystal light valves, dichroic prisms and projection lens.

Images displayed on the screen are from left to right and from top to bottom. To create such an image on the screen, the blue, green and red images produced by liquid crystal light valves 108B, 108G and 108R, respectively, are displayed in the directions shown in FIGS. 3 and 4. The image displayed by each liquid crystal light valve is turned upside down. The direction of the image produced by liquid crystal light valve 108G is also turned sideways. The directions of images produced by liquid crystal light valves 108R and blue light liquid crystal light valve 108B are turned sideways by red refection surface 110 and blue reflection surface 111 of dichroic prism group 109, respectively.

The driving circuits (discussed below) associated with the light valves can be built into the light valves or attached to their outer frame. A driving circuit built into a light valve includes mask correction. If the driving circuit is connected to the outer frame of light valve 108G, the connection between the driving circuit and light valve 108G compared to the driving circuits and associated with the other two light valves will be different (as discussed below). By providing a driving circuit for controlling one of the three liquid crystal light valves so that only a mirror image is transmitted therethrough, device 100 produces a high quality picture with excellent contrast ratio.

Figure 5:
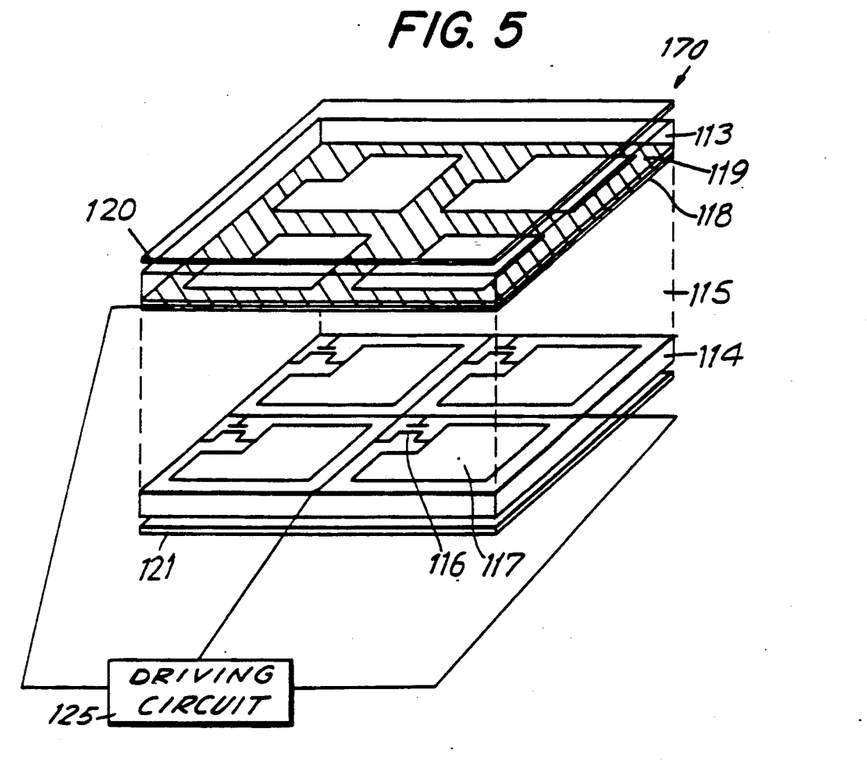
FIG. 5 is a diagrammatic perspective view, partially in cross section, of a liquid crystal light valve.

The construction of light valves 108B, 108G and 108R is illustrated by a light valve 170 shown in FIG. 5. Light valve 170 is an active matrix type liquid crystal valve and includes a fused quartz lower transparent substrate 114. A driving circuit 125 shown in FIGS. 12(a), 12(b), 12(c) and 12(d) may be formed on the interior surface of substrate 114. A driving circuit 128 (shown in FIGS. 13(a) and 13(b)) is attached to light valve 170. Driving circuits 125 and 128 drive a matrix array of a picture element electrode 117 coupled to a corresponding thin film transistor (TFT) 116. An upper transparent glass substrate 113 is spaced apart from lower substrate 114 by spherical spacers (not shown). Liquid crystal material 115 is disposed in the space between upper substrate 113 and lower substrate 114. A common electrode 118 and a light protection layer 119 are formed on upper substrate 113. Light protection layer 119 shields at least TFT 116 and data and signal lines formed on lower substrate 114 from light.

Driving circuits 125 or 128 selectively turns picture elements in light valve 170 ON and OFF. Suitable materials for forming TFT 116 include, but are not limited to, polysilicon, amorphous silicon and a compound semiconductor. Other suitable elements with two terminals having diode characteristics may be used in place of TFT 116, such as a ring diode, metal insulator metal (MIM) or simple matrix driving. An upper polarization plate 120 is disposed on the exterior surface of upper substrate 113. A lower polarization plate 121 is disposed on the exterior surface of lower substrate 114. Only light with a specific polarized angle will be transmitted through liquid crystal light valve 170.

Depending upon the voltage applied to liquid crystal driving electrode 117, the picture element of pixel will be in an ON state (rendered visually distinguishable from the display background) or an OFF state (not distinguishable). Each pixel in liquid light valve 170 therefore acts like a shutter for controlling transmission of light therethrough. Generally, TFT 116 is sensitive to and is adversely affected by light striking it. When incident light strikes TFT 116, the ON-OFF threshold level (i.e., ratio) changes resulting in a deterioration in the contrast ratio of the image produced by liquid crystal light valve 170. Therefore, light enters liquid crystal light valve 170 by first passing through upper substrate 113 so that light protection layer 119 shields at least TFT 116 from light.

Liquid crystal valves 170 include a twisted nematic (TN) liquid crystal material. The liquid crystal material has a double refraction ratio n whose optimum value is in accordance with the primary color passing therethrough to obtain a high contrast ratio.

The optical distance between liquid crystal light valve 108R and light source 101 is longer than the optical distances between liquid crystal light valve 108G and light source 101 or liquid crystal light valve 108B and light source 101. Consequently, red light from light source 101 is dampened more than blue light or green light is before reaching its associated light valve.

Figure 6:
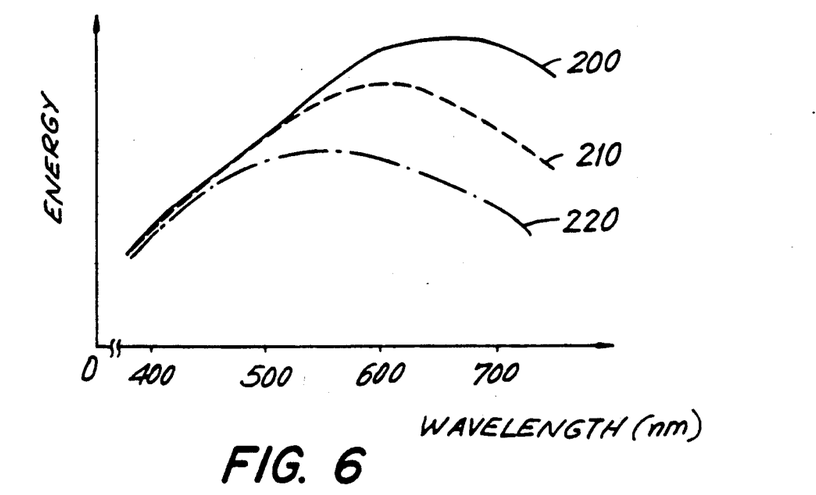
FIG. 6 is a plot of luminous energy levels versus wavelengths of a conventional tungsten halogen lamp and of the projection-type display devices of FIG. 1 and FIG. 7.

The spectral characteristics of a tungsten halogen lamp are represented by a solid line 200 shown in FIG. 6. Tungsten halogen lamps peak (i.e., have a high level of luminous intensity) around the wavelength of red light. With a tungsten halogen lamp serving as light source 101 and radiating white light at a low color temperature of about 3000° K. the image produced by device 100 has a color temperature of about 6000° K. with a spectral curve represented by a dotted line 210 in FIG. 6. A filter, such as an ND filter, is not required for maintaining color balance. The image produced by device 100 has a high saturation level with excellent color reproducibility and meets the well known television standards (i.e., NTSC, PAL and SECAM) set for broadcasting and communications.

Device 100 with a tungsten halogen lamp serving as light source 101 displays a well balanced image having a high level of picture quality. Dichroic mirror group segregates the colored light into its primary colors and is positioned within device 100 so that the optical lengths associated with the primary colors vary. Similar results can be achieved using other white light sources having spectral characteristics similar to a tungsten halogen lamp (i.e., spectral curve peaks around the wavelength for red light).

Figure 7:
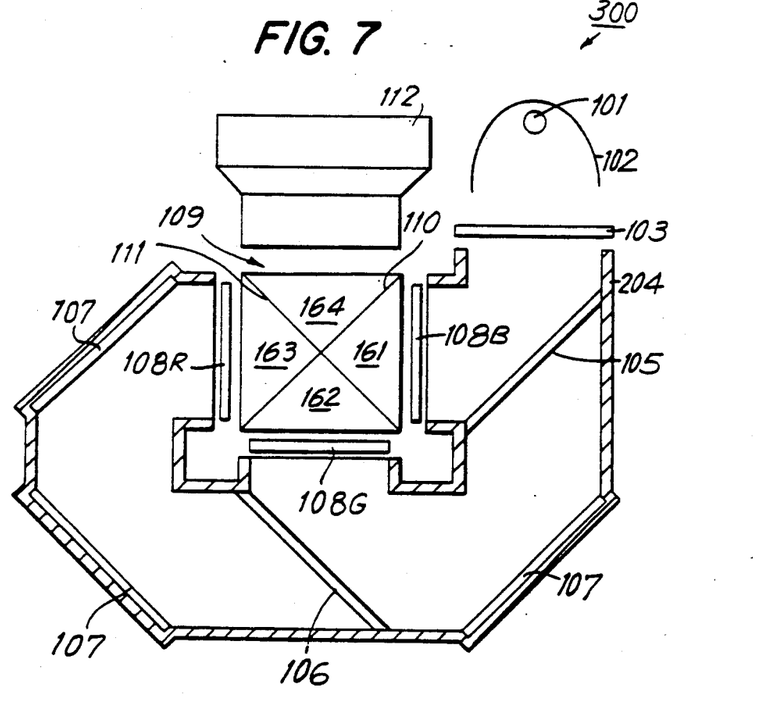
FIG. 7 is a top plan view, partially in cross section, of a projection-type display device in accordance with an alternative embodiment of the invention.

As shown in FIG. 7, a projection-type display device 300 also employs a tungsten halogen lamp as light source 101. The construction and operation of device 300 is similar to that of device 100 except that the position of dichroic mirrors 105 and 106 and light source 101 have been changed and a rearranged light guide 204 is provided. The optical distance between light source 101 and liquid crystal light valve 108R is greater than the optical distance between light source 101 and liquid crystal light valve 108G which is greater than the optical distance between light source 101 and liquid crystal light guide 108B. Therefore, red light is damped more than green light which is damped more than blue light. With a tungsten halogen lamp having a color temperature of about 9300° K., which is the color temperature of white light displayed by a cathode-ray tube, the image displayed by device 300 will have a white color temperature of about 9000° K. The image will be well balanced with a high saturation level and a substantially flat spectral curve represented by a dot-dash line 220 of FIG. 6.

When using a tungsten halogen lamp as light source 101, it is more effective to minimize the optical length of blue light. Accordingly, dichroic mirrors 105 and 106 are arranged so that the optical distances increase for the primary colors beginning with blue light, increasing to green light and ending with red light (i.e., red light having the greatest optical distance).

Embodiment 2

Figure 8:
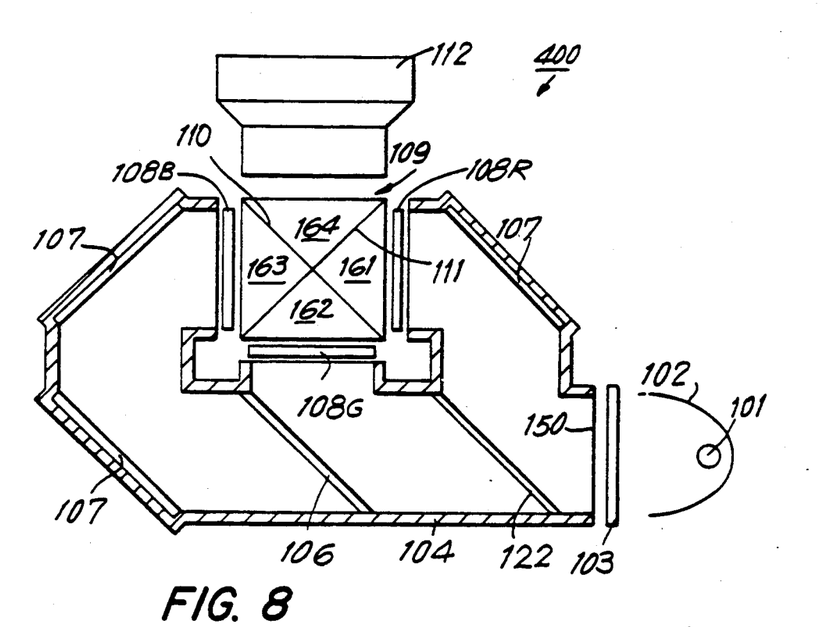
FIG. 8 is a top plan view, partially in cross section, of a projection-type display device in accordance with another alternative embodiment of the invention.
Figure 9:
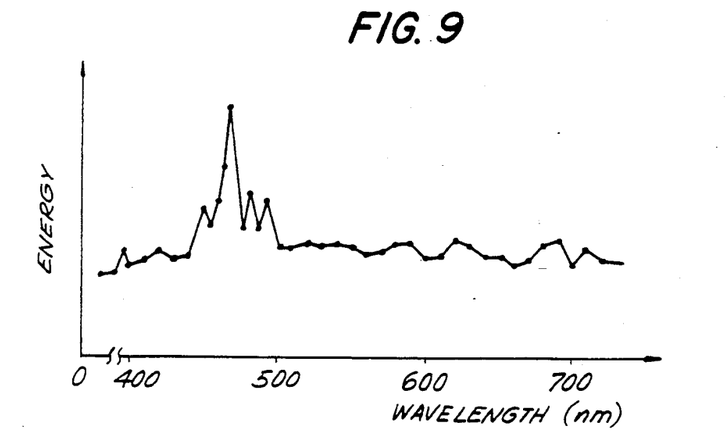
FIG. 9 is a plot of luminous energy level versus wavelength of a conventional xenon lamp.

As shown in FIG. 8, a projection-type display device 400 uses a xenon lamp as light source 101. The spectral characteristics of a conventional xenon lamp are shown in FIG. 9 wherein the peak energy level is within the range of the blue wavelength of light. That is, a xenon lamp has a high level of luminous intensity around the wavelength for blue light.

Device 400 is similar to device 100 in construction except that a xenon lamp is used for light source 101, blue light dichroic mirror 105 is replaced with red light dichroic mirror 122, and the positions of light valves 108B and 108R, and red reflection surface 110 and blue reflection surface 111 are switched. A substantially right angle is maintained between reflection surfaces 110 and 111. The spectral characteristics of red light dichroic mirror 122 are shown in FIG. 2.

Light passing through opening 150 strikes red light dichroic mirror 122 which reflects that portion of the visible light having a wavelength of about 590 nm and greater. The red light is then redirected by reflection mirror 107 towards light valve 108R. Green light contained with the visible light transmitted through red light dichroic mirror 122 is reflected by green light dichroic mirror 106 towards liquid crystal light valve 108G. The residual visible light transmitted through green light dichroic mirror 106 is reflected by reflection mirror 107 and directed toward liquid crystal light valve 108B.

Since a xenon lamp has a spectral characteristic which includes a peak around the wavelength for blue light, liquid crystal light valve 108B rather than liquid crystal light valves 108G or 108R is disposed furthest from light source 101 of device 400. Blue light will be dampened more than the green light or the red light emitted from the xenon lamp creating a well balanced color image produced by device 400. Light sources having wavelengths with peaks around the wavelength for blue light other than a xenon lamp also can be used in device 400 as light source 101 resulting in production of a well balanced color image. In this embodiment, a red modulation liquid crystal light valve 108R is replaced with a blue modulation liquid crystal light valve 108B, and a green modulation light valve 108G displays reflectively symmetric images in the same way as in the Embodiment 1.

Embodiment 3

Figure 10:
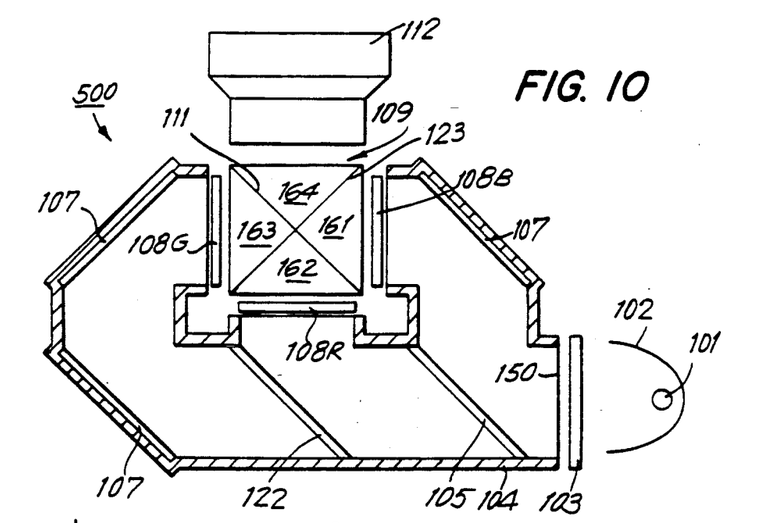
FIG. 10 is a top plan view, partially in cross section, of a projection-type display device in accordance with yet another alternative embodiment of the invention.

As shown in FIG. 10, a projection-type display device 500 is substantially similar to device 100 except that a metal halide lamp is used as light source 101, green dichroic mirror 106 is replaced with red dichroic mirror 122, liquid crystal light valves 108G and 108R are switched and red reflection surface 110 is replaced with a green reflection surface 123.

Figure 11:
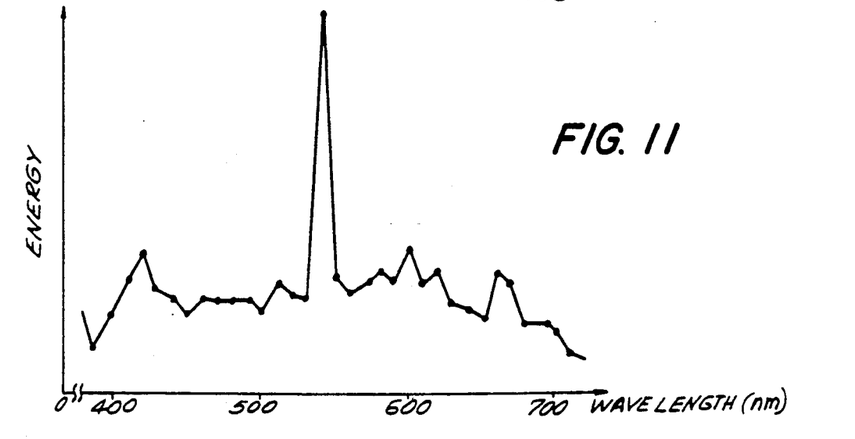
FIG. 11 is a plot of luminous energy level versus wavelength of a conventional metal halide lamp.

Referring momentarily to FIG. 11, the spectral characteristics for a conventional metal halide lamp are shown. A peak within the spectral curve occurs around the wavelength for green light. In other words, the spectral curve has its highest level of luminous intensity occurring around the wavelength for green light.

In operation, light passing through opening 150 of device 500 is reflected by blue dichroic mirror 105 and redirected by reflection mirror 107 towards liquid crystal light valve 108B. Light passing through blue dichroic mirror 105 which strikes red dichroic mirror 122 reflects the red light therein toward liquid crystal light valve 108R. The residual visible light passing through red light dichroic mirror 122 is reflected by reflection mirror 107 towards liquid crystal light valve 108G.

Liquid crystal light valve 108G and liquid crystal light valve 108B both produce an image which is upside down but not reversed in direction. The image provided by liquid crystal light valve 108R, however, is turned both upside down and reversed in direction.

Reflection surface 111 reverses the direction of the image produced by liquid crystal light valve 108B. Similarly, the image produced by liquid crystal light valve 108G is reversed in direction by green reflection surface 123. Green reflection surface 123 is similar to red reflection surface 110 of device 100 in its position within dichroic prism group 109. Green reflection surface 123 and blue reflection surface 111 cross each other at substantially right angles. The wavelength characteristics of blue reflection surface 111 and green reflection surface 123 are the same as those shown for blue dichroic mirror 105 and green dichroic mirror 106 of FIG. 2. A symmetrical image is produced in the same manner as that disclosed in Embodiment 1 except that liquid crystal light valve 108R is switched with that of 108G.

The optical lengths between the metal halide lamp serving as light source 101 and each of the three liquid crystal light valves is designed so that green light has the furthest distance to travel from light source 101 before reaching its corresponding light valve (i.e., light valve 108G). Light valve 108G is no longer restricted by its corresponding driving circuit to produce mirror images. Instead, light valve 108R is now restricted to producing mirror images due to its corresponding driving circuit. Consequently, a well balanced color image is produced by device 500 having a substantially flat spectral characteristic curve.

If the spectral curve of the metal halide lamp includes peaks at not only the green wavelength but also at the red wavelength, a well balanced color image having high saturation can be obtained by modifying the construction of light guide 104 of device 500 to conform to light guide 204 of device 300 of FIG. 7. More particularly, the position of liquid crystal light valves 108G, 108R and 108B as well as blue reflection surface 111 and green reflection surface 123 remain as shown in device 500 of FIG. 10. The construction of light guide 104 and position of light source 101, however, are changed to conform to the construction and position of light guide 204 and light source 101 in device 300. Green dichroic mirror 122 replaces and is in the position shown for red dichroic mirror 106 of device 300. Blue dichroic mirror 105 is in the position as shown in device 300. Consequently, the optical distance between light source 101 and light valve 108B is less than the optical distance between light source 101 and light valve 108R which is less than the optical distance between light source 101 and light valve 108G.

Light sources having a high level of luminous intensity for wavelengths around green light can be used in place of a metal halide lamp as light source 101 for device 500 while providing the same excellent color balance and high level of color reproducibility.

Embodiment 4

Figure 14:
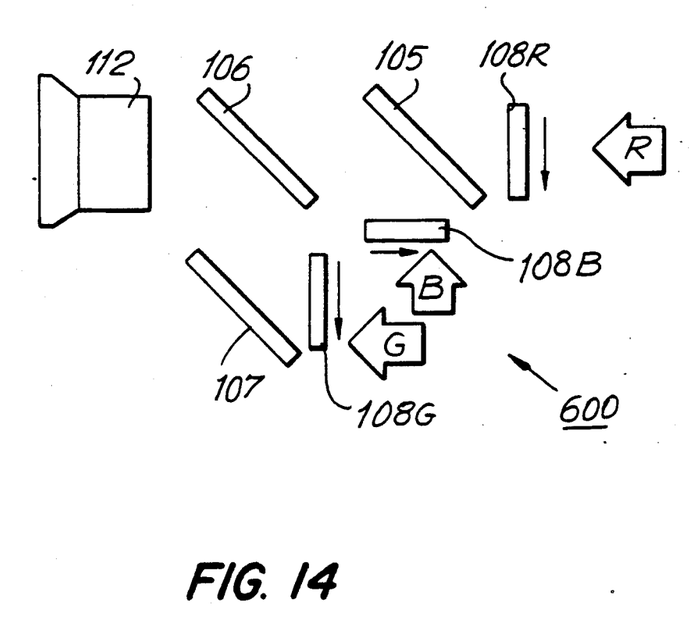
FIG. 14 is a top plan view of a projection-type color display device in accordance with still another alternative embodiment of the invention.

The image forming portion 600 of a projection-type color display device in accordance with another alternative embodiment of the invention is shown in FIG. 14. The optical system of image forming portion 600 which produces and transmits the light to the liquid crystal light valves has been omitted from FIG. 14 for clarity. Similar to the other embodiments, light produced by a light source (not shown) is segregated into its primary colors of blue, green and red which are then directed toward their corresponding liquid crystal light valves 108B, 108G and 108R, respectively. As shown by the arrows in FIG. 14, the direction of the image produced by liquid crystal light valve 108B (i.e., blue image) is substantially perpendicular (i.e., turned sideways) with respect to the direction of the images produced by liquid crystal light valves 108G (i.e., green image) and 108R (i.e., red image). The red and green images are displayed by liquid crystal light valves 108R and 108G in the same direction, respectively.

Liquid crystal light valves 108B, 108G and 108R modulate the primary colors of blue, green and red in accordance with the picture image data to produce the blue, green and red images. The green image produced by liquid crystal light valve 108G is reflected twice, that is, first by reflection mirror 107 and then by green light dichroic mirror 106 prior to being directed towards projection lens 112. The blue image produced by liquid crystal light valve 108B is reflected by blue light dichroic mirror 105 and transmitted through green light dichroic mirror 106 prior to being directed towards projection lens 112. The red image produced by liquid crystal light valve 108R is transmitted through blue light dichroic mirror 105 and green light dichroic mirror 106 prior to being directed towards projection lens 112. The red, green and blue images are combined at green light dichroic mirror 106 to produce a synthesized image which is then magnified for projection by projection lens 112.

Referring once again to FIG. 3, the directions in which the images are displayed by the liquid crystal light valve are based on the direction in which the liquid crystal displays are driven. By driving green light valve 108G of FIGS. 1, 7 and 8, red light valve 108R of FIG. 10 and light valves 108G and 108R of FIG. 14 so that the horizontal scan of the image by the light valve 108B is opposite to the horizontal scan of the image of the other two light valves, these is no need to flip the middle light valve. Accordingly, light protection layer 119 is positioned to intercept incident light entering the middle light valve prior to the incident light passing through TFT 116.

Figure 12A:
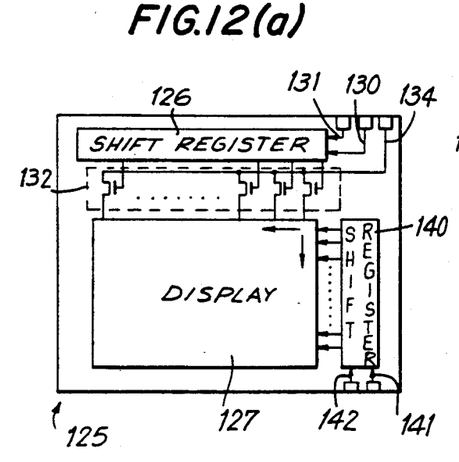
FIGS. 12(a), 12(b), 12(c) and 12(d) are circuit diagrams in accordance with a first embodiment of the invention for driving the three light valves.
Figure 12B:
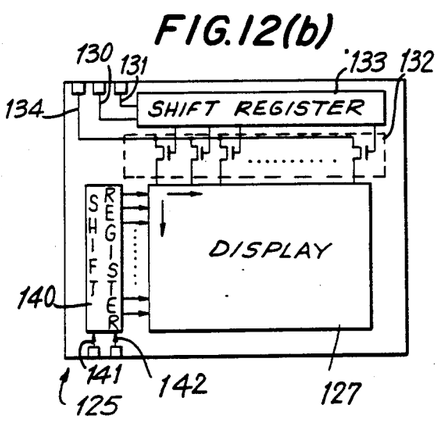
Figure 12C:
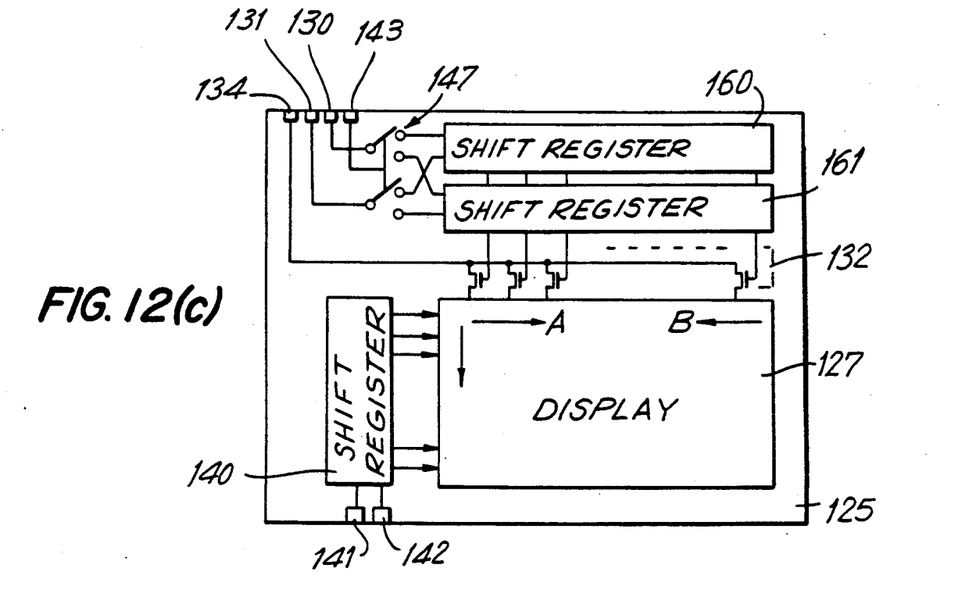
Figure 12D:
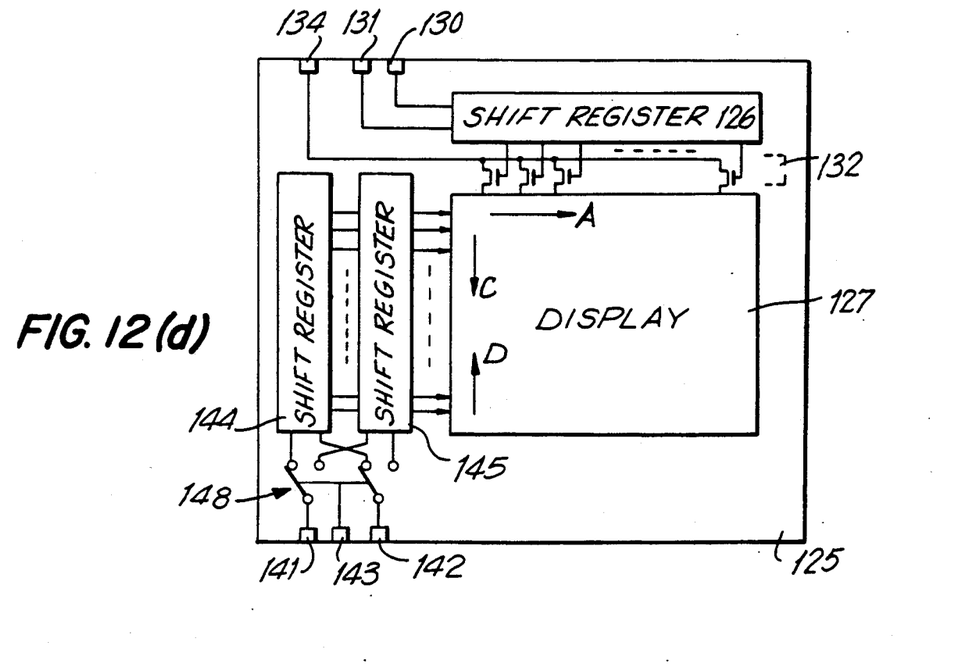
Figure 13A:
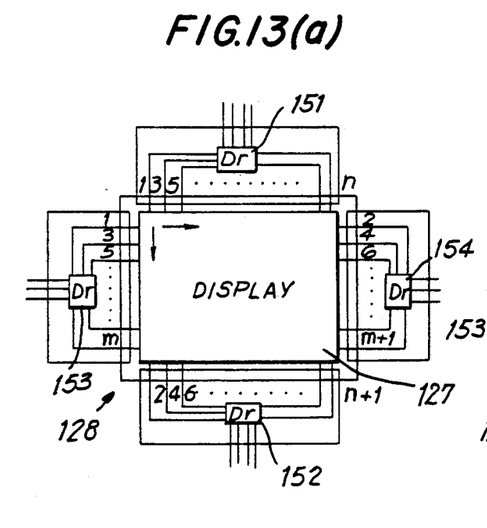
FIGS. 13(a) and 13(b) are circuit diagrams in accordance with an alternative embodiment of the invention for driving the three light valves.
Figure 13B:
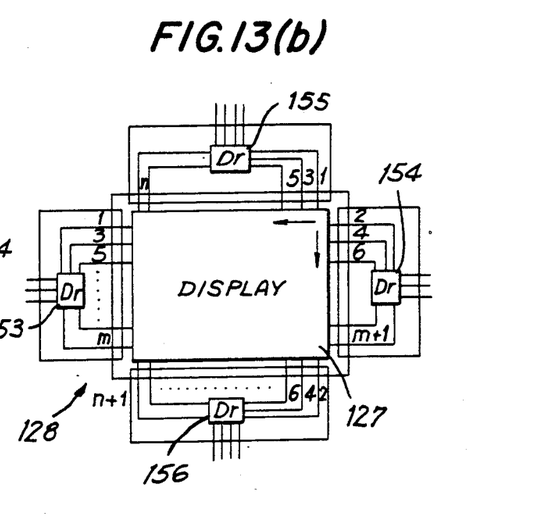

Different embodiments for driving the three light valves to provide such horizontal scanning are shown in FIGS. 12(a), 12(b), 12(c), 12(d) and 13(a), 13(b). The driving circuits of FIGS. 12(a), 12(b), 12(c) and 12(d) are fabricated on the active substrate of the active matrix panel by using TFT technology and include mask correction. The circuits of FIGS. 13(a) and 13(b) are connected to the outer frame of the light valves.

In the first embodiment shown in FIG. 12(a), the image produced by light valves 108B and 108R of FIGS. 1, 7 and 8 and light valves 108G and 108B of FIG. 10 and light valve 108B of FIG. 14 is based on a driving circuit 125 which includes a horizontal scanning shift registers 126 and a vertical scanning shift register 140. Shift register 126, coupled to a horizontal scanning line, receives a horizontal scanning signal (i.e., video data) supplied from a horizontal scanning signal line 131. Video data is shifted in horizontal scanning shift register 126 from right to left. The video data is then outputted as a control signal to a sample and hold circuit 132 in accordance with clock pulses supplied from a clock line 130. Clock line 130 is also coupled to the horizontal scanning line. The control signal controls the operation of sample and hold circuit 132 and shifts the video data of video data line 134 from right to left within sample and hold circuit 132. The video data representing one complete video data line 134 is supplied to display 127 from sample and hold circuit 132 for each cycle (i.e., completes one horizontal scanning period).

Shift register 140, coupled to a vertical scanning line, receives a vertical scan signal (i.e., video data) applied by vertical scanning signal line 142. Video data is vertically shifted in shift register 140 from top to bottom and outputted as a column-selected signal from top to bottom in accordance with the clock pulses supplied from a clock line 141. Clock line 141 is coupled to the vertical scanning line. The clock frequency of clock line 130 is equal to the clock frequency of clock line 141. One cycle within a vertical scanning period is considered completed once the video data has been shifted from top to bottom.

Video data is written into the picture element corresponding to the intersection of the control signal coupled to the horizontal scanning line and the selecting signal coupled to the vertical scanning line. The video data is also written consecutively (i.e., one picture element after another) from right to left and from top to bottom.

As shown in FIG. 12(*b*), driving circuit 125 for light valve 108G of FIGS. 1, 7 and 8, light valve 108R of FIG. 10 and light valves 108G and 108R of FIG. 14 is constructed and operates substantially similar to driving circuit 125 of FIG. 12(*a*) except that a shift register 133 is substituted for shift register 126. The same data which is received by shift register 126 of FIG. 12(*a*) is received by shift register 133 but is shifted from left to right within shift register 133 rather than from right to left as in shift register 126. The masks used for the light valves of FIG. 12(*a*) and 12(*b*) are mirror images of one another, that is, they are inverted sideways relative to each other. Accordingly, the image produced by driving circuit 125 of FIG. 12(*b*) is the reverse (from side to side) of the image produced by driving circuit 125 of FIG. 12(*a*).

Display of the inverted image, from side to side, of the liquid crystal light panel without including mask correction is shown in FIG. 12(*c*) in which video data is shifted bidirectionally. Driving circuit 125 for each light valves includes a horizontal scanning shift register 160 and horizontal scanning shift register 161 and a switch 147. Shift registers 160 and 161 shift video data in opposite directions (i.e., opposite sideways directions) to one another. Thus, the horizontal scanning direction of the foregoing liquid crystal light valves can be controlled by a control signal supplied from control signal line 143 to switch 147. Switch 147 controls whether the clock pulses of clock line 130 and horizontal scanning signal from horizontal scanning signal line 131 are supplied to shift register 160 or 161. Consequently, the video data can be written into display 127 in directions denoted by a pair of arrows A and B forming images which are the reverse of one another from side to side.

By providing two shift registers for horizontal scanning, data can be shifted bidirectionally. Therefore, similar driving circuitry can be used for each of the liquid crystal light valves. A sideways inverted image also can be displayed even when vertically inverting each liquid crystal light valve which is to produce an inverted sideways image by vertically scanning the image from bottom to top, that is, opposite to the direction of FIG. 12(*a*). More particularly, as shown in FIG. 12(*d*), driving circuit 125 of the liquid crystal light valve includes vertical scanning shift register 144 and vertical scanning shift register 145 which scan in opposite vertical directions to one another. A control signal supplied from control signal line 143 to a switch 148 controls whether the clock pulses of clock line 141 and vertical scan signal supplied by vertical scanning line 142 are supplied to shift register 144 or 145. The video data is written into display 127 in one of two vertical directions denoted by a pair of arrows C and D. The image which is to be reversed is written in the vertical direction of arrow D and in the horizontal direction of arrow A. In other words, a sideways inverted image can be displayed by vertically inverting the liquid crystal light valve wherein shift register 145 scans in the opposite direction to the circuit disclosed in FIG. 12(*a*). In particular, vertical scanning will be in the direction of arrow D as shown in FIG. 12(*d*). Therefore, the same type of driving circuitry can be used for each of the liquid crystal light valves even when one or more of the liquid crystal light valves has been flipped upside down.

In the second embodiment, as shown in FIG. 13(*a*), the image produced by light valves 108B and 108R of FIGS. 1, 7 and 8, light valve 108G and 108B of FIG. 10 and light valves 108B of FIG. 14 is based on discrete driving circuits 128 connected to the frame of the light valve. Driving circuits 128 of FIG. 13(*a*) include drivers 151 and 152 which receive a horizontal scan signal (video data) to drive the odd columns (1, 3, 5, . . . n) and even columns (2, 4, 6, . . . (n+1)) of display 127, respectively. A pair of drivers 153 and 154 receive the vertical scan data to vertically scan the odd rows (1, 3, 5, . . . m)) and even rows (2, 4, 6, . . . (m+1)) of display 127. In FIG. 13(*a*), the video data is not shifted as in FIG. 12(*a*) but rather is stored and directed to specified positions from left to right of display 127. Drivers 151 and 152 can include, but are not limited to, registers (not shown) which store the video data at specified positions addressed by control signals from clock generators (not shown). Once a complete row of video data is stored in drivers 151 and 152, the video data can be vertically scanned for display by drivers 153 or 154. Driving circuits 128 of FIG. 13(*a*) drive display 127 to produce an image similar to the image produced by display 127 of FIG. 12(*b*).

Driving circuits 128 of FIG. 13(*b*) drive light valves 108G of FIGS. 1, 7 and 8, light valve 108R of FIG. 10 and light valves 108R and 108G of FIG. 14 to produce an image similar to the image of FIG. 12(*a*). FIGS. 13(*a*) and 13(*b*) are constructed and operate substantially the same except that drivers 151 and 152 are replaced with a pair of drivers 155 and 156 of FIG. 13(*b*). More particularly, drivers 155 and 156 compared to drivers 151 and 152, respectively, are invertedly assembled to display 127. The video data in drivers 155 and 156 is stored and directed to specified portions from right to left of display 127. The image produced by driving circuit 128 of FIG. 13(*b*) is the reverse (from side to side) of the image produced by driving circuit 128 of FIG. 13(*a*).

A sideways inverted image may also be displayed by invertedly assembling drivers 153 and 154 of FIGS. 13(*a*) and 13(*b*) while leaving drivers 151 and 152 in their original position. In this embodiment, the liquid crystal light valve must be vertically inverted. The sideways inverted image also may be displayed by inverting the output orders of drivers 151 and 152 or by inverting the output order of drivers 153 and 154 and controlling the external control signal in order to obtain the desired sideways inverted image.

The effect obtained by the foregoing embodiments wherein the image of one liquid crystal valve is inverted sideways relative to the other two liquid crystal light valves is not limited to projection type devices wherein the distance between the light source and each liquid crystal light valve is different. The same advantages can be obtained when the distances between the light source and each liquid crystal light valve is the same.

As now can be readily appreciated, projection-type display devices 100, 300, 400, 500 and 600 produce a white balanced image without the use of filters such as, but not limited, to a ND filter. The elimination of such filters is achieved, in part, by providing that the optical distance between light source 101 and the light valve associated with the primary color having the highest level of luminous intensity generated by light source 101 is greater than the optical distances between light source 101 and each of the other two light valves. Similarly, the invention provides that the optical distance between light source 101 and the light valve associated with the primary color having the lowest level of luminous intensity is less than the optical distances between light source 101 and each of the other two light valves. The invention provides an image having a high saturation level with extremely high color temperature and excellent color reproducibility which meets the television industry standards set for broadcasting and communication.

Scattering of light which can reduce the brightness of the image produced by a projection-type display device is eliminated by light guide 104. Therefore, light from white source 101 representative of the image is efficiently utilized providing a bright image displayed by the invention.

The active elements of the matrix-type liquid crystal light valve are advantageously controlled by driving circuit 125 so that one of the three liquid crystal light valves displays a mirror image of the images produced by the other two liquid crystal light valves. TFT 116 are protected from light striking it through light protection layer 119. Additionally, the invention provides for construction of a projection-type display device which is compact in size with a high contrast ratio and excellent overall quality of the image.

Light shielding protection for TFT 116 of each light valve is provided through driving circuitry 125 of FIGS. 12(*a*), 12(*b*), 12(*c*) and 12(*d*).

It will thus be seen that the objects set forth above, and those made apparent from the preceding description, are efficiently attained and, since certain changes may be made in the above method and construction set forth without departing from the spirit and scope of the invention, it is intended that all matter contained in the above description and shown in the accompanying drawings shall be interpreted as illustrative and not in a limiting sense.

It is also to be understood that the following claims are intended to cove all the generic and specific features of the invention herein described and all statements of the scope of the invention, which, as a matter of language, might be said to fall therebetween.

What is claimed is:

1. A projection-type display device in which light produced by a light source is directed towards a first liquid crystal light valve associated with a first primary color for producing a first image, a second liquid crystal light valve associated with a second primary color for producing a second image and a third liquid crystal light valve associated with a third primary color for producing a third image, the liquid crystal light valves including a plurality of picture element electrodes arranged in an active matrix array, comprising:

integrating means for combining the three images by reflecting at least one of the three images and transmitting at least one of the three images to produce a synthesized image; and driving means associated with each light valve for driving each of the three light valves, each driving means includes horizontal scanning shift register means for horizontally scanning the image to be produced by the associated light valve;

wherein the horizontal scanning direction of the horizontal scanning shift register means associated with one of the light valves transmits an image opposite to the image transmitted by scanning direction of the horizontal scanning shift register means associated with the other two light valves so that the image produced by the one light valve is synchronized with the images of the other two light valves.

2. The projection type display device of claim 1, further including mask means associated with each light valve for shielding portions of that light valve from the associated primary color.

3. The projection-type display device of claim 1; further including a light source for producing light having a plurality of colors; and segregating means for segregating the light into the plurality of colors including the first, second and third primary colors; wherein the optical lengths from the light source to the first light valve, second light valve and third light valve are different and are based on the luminous intensities of the primary colors, respectively.

4. The projection-type display device of claim 3, wherein the first primary color is red and has the greatest luminous intensity of all three primary colors produced by the light course and is associated with the longest optical length.

5. The projection-type display device of claim 4, in which a tungsten lamp serves as the light source.

6. The projection-type display device of claim 3, wherein the first primary color is blue and has the greatest luminous intensity of all three primary colors produced by the light source and is associated with the longest optical length.

7. The projection-type display device of claim 6, in which a xenon lamp serves as the light source.

8. The projection-type display device of claim 3, wherein the first primary color is green and has the greatest luminous intensity of all three primary colors produced by the light source and is associated with the longest optical length.

9. The projection-type display device of claim 8, in which a metal halide lamp serves as the light source.

10. The projection-type display device of claim 3, wherein the third primary color is blue and has the smallest luminous intensity of all three primary colors produced by the light source and is associated with the shortest optical length.

11. The projection-type display device of claim 10, in which a tungsten lamp serves as the light source.

12. The projection-type display device of claim 10, in which a metal halide lamp serves as the light source.

13. The projection-type display device of claim 3, wherein the third primary color is red and has the smallest luminous intensity of all three primary colors produced by the light source and is associated with the shortest optical length.

14. The projection-type display device of claim 13, in which a xenon lamp serves as the light source.

15. The projection-type display device of claim 3, in which a tungsten lamp serves as the light source.

16. The projection-type display device of claim 3, in which a xenon lamp serves as the light source.

17. The projection-type display device of claim 3, in which a metal halide lamp serves as the light source.

18. The projection-type display device of claim 1, wherein each light valve of the liquid crystal light valve means is a liquid crystal panel.

19. The projection-type display device of claim 1, wherein the horizontal scanning shift register means for each light valves receives the same horizontal scanning signal.

20. A method for producing an image projected from a liquid crystal display device which includes a first liquid crystal light valve associated with a first primary color for producing a first image, a second liquid crystal light valve associated with a second primary color for producing a second image and a third liquid crystal light valve associated with a third primary color for producing a third image, comprising the steps of: combining the three images by reflecting at least one of the three images and transmitting at least one of the three images; and
    driving each of the three light valves to control production of the images, said driving of each light valve including horizontally scanning the image to be produced by the light valve;
    wherein the horizontal scanning direction associated with light valves which produce images reflected and transmitted in combining the three images together are opposite in direction.

21. The method of claim 20, further providing light shielding protection to portions of each light valve from the associated primary color.

22. A projection-type display device in which light produced by a light source is directed towards a first liquid crystal light valve associated with a first primary color for producing a first image, a second liquid crystal light valve associated with a second primary color for producing a second image and a third liquid crystal light valve associated with a third primary color for producing a third image, the liquid crystal light valves including a plurality of picture element electrodes arranged in an active matrix array, comprising:
    integrating means for combining the three images by reflecting the first image twice, by first reflecting the second image and then transmitting the reflected image, and by transmitting the third image twice to produce a synthesized image; and
    driving means for driving the image produced by the first and third light valves in a first direction and driving the second image in a second direction, each driving means includes a horizontal scanning shift register means for horizontally scanning the image to be produced by the associated light valve;
    wherein the horizontal scanning directions of the horizontal scanning shift register means associated with the images of the first and third light valves transmit an image opposite to the scanning direction of the horizontal scanning shift register means associated with the image of the second light valve so that the image produced by one light valve is synchronized with the image of the other two light valves.

23. The projection-type device of claim 22, wherein the first primary color is green.

24. The projection-type device of claim 22, wherein the second primary color is blue.

25. The projection-type device of claim 22, wherein the third primary color is red.

26. The projection-type display device of claim 22, wherein the horizontal scanning shift register means for each light valve receives the same horizontal scanning signal.

27. A projection-type display device in which light produced by a light source is directed towards a first liquid crystal light valve associated with a first primary color for producing a first image, a second liquid crystal light valve associated with a second primary color for producing a second image and a third liquid crystal light valve associated with a third primary color for producing a third image, the liquid crystal light valves including a plurality of picture element electrodes arranged in an active matrix array, comprising:
    integrating means for combining the three images by reflecting at least one of the three images and transmitting at least one of the three images to produce a synthesized image; and
    driving means for driving each of the three light valves, each driving means including one of a horizontal scanning means for horizontally scanning the image to be produced by the associated light valve and a vertical scanning means for vertically scanning the image to be produced by the associated light valve, the driving means further including bidirectional shift registers for shifting the image in one of the horizontal scanning direction and the vertical scanning direction;
    wherein the horizontal scanning direction of the horizontal scanning means associated with one of the light valves transmits an image opposite to the scanning direction of the horizontal scanning means associated with the other two light valves and the vertical scanning direction of the vertical scanning means associated with one of the light valves transmits an image opposite to the scanning direction of the vertical scanning means associated with the other two light valves.

28. A projection-type display device in which light produced by a light source is directed towards a first liquid crystal light valve associated with a first primary color for producing a first image, a second liquid crystal light valve associated with a secondary primary color for producing a second image and a third liquid crystal light valve associated with a third primary color for producing a third image, the liquid crystal light valves including a plurality of picture element electrodes arranged in an active matrix array, comprising:
    integrating means for combining the three images by reflecting at least one of the three images and transmitting at least one of the three images to produce a synthesized image; and
    driving means for driving each of the three light valves, the driving means for one light valve being invertedly by assembled with respect to the driving means for the other two light valves, each driving means including horizontal scanning means for horizontally scanning the image to be produced by the associated light valve;

wherein the horizontal scanning direction of the horizontal scanning means associated with the light valve of the invertedly assembled driving means transmits an image opposite to the scanning direction of the horizontal scanning associated with light valves of the other two driving means.

29. A projection-type display device in which light produced by a light source is directed towards a first liquid crystal light valve associated with a first primary color for producing a first image, a second liquid crystal light valve associated with a second primary color for producing a second image and a third liquid crystal light valve associated with a third primary color for producing a third image, the liquid crystal light valves including a plurality of picture element electrodes arranged in an active matrix array, comprising:

integrating means for combining the three images by reflecting the first image twice, by first reflecting the second image and then transmitting the reflected image, and by transmitting the third image twice to produce a synthesized image; and driving means for driving the image produced by the first and third light valves in a first direction and driving the second image in a second direction, each driving means including one of a horizontal scanning means for horizontally scanning the image to be produced by the associated light valve and a vertical scanning means for vertically scanning the image to be produced by the associated light valve, the driving means further including bidirectional shift registers for shifting the image in one of a horizontal scanning direction and a vertical scanning direction;

wherein the horizontal scanning directions of the horizontal scanning means associated with the images of the first and third light valves transmit an image opposite to the scanning direction of the horizontal scanning means associated with the image of the second light valve and the vertical scanning directions of the vertical scanning means associated with the images of the first and third light valves transmit an image opposite to the scanning direction of the vertical scanning means associated with the image of the second light valve.

30. A projection-type display device in which light produced by a light source is directed towards a first liquid crystal light valve associated with a first primary color for producing a first image, a second liquid crystal light valve associated with a second primary color for producing a second image and a third liquid crystal light valve associated with a third primary color for producing a third image, the liquid crystal light valves including a plurality of picture element electrodes arranged in an active matrix array, comprising:

integrating means for combining the three images by reflecting the first image twice, by first reflecting the second image and then transmitting the reflected image, and by transmitting the third image twice to produce a synthesized image; and driving means for driving the image produced by the first and third light valves in a first direction and driving the second image in a second direction, the driving means for the second light valve being invertedly by assembled with respect to the driving means for the first and third light valves, each driving means including horizontal scanning means for horizontally scanning the image to be produced by the associated light valve;

wherein the horizontal scanning directions of the horizontal scanning means associated with the image of the second light valve transmits an image opposite to the scanning direction of the horizontal scanning means associated with the first and third light valves.

* * * * *